United States Patent [19]

Cheng

[11] Patent Number: 4,855,267
[45] Date of Patent: Aug. 8, 1989

[54] REGENERATION OF METHANOL DISSOCIATION CATALYSTS

[75] Inventor: Wu-Hsun Cheng, Kennett Square, Pa.

[73] Assignee: E. I. Du Pont de Nemours and Company, Wilmington, Del.

[21] Appl. No.: 186,042

[22] Filed: Apr. 25, 1988

[51] Int. Cl.$^4$ .................... B01J 23/94; B01J 38/18; C01B 1/13; C01B 31/18
[52] U.S. Cl. .................... 502/50; 252/373; 423/415 A; 423/648.1; 502/38; 502/52; 502/53
[58] Field of Search .................... 502/50–53, 502/38, 45–49; 423/415 A, 648.1

[56] References Cited

U.S. PATENT DOCUMENTS

| | | | |
|---|---|---|---|
| 2,947,707 | 8/1960 | Wells, Jr. | 502/51 |
| 3,645,913 | 2/1972 | Hobermann | 502/50 |
| 3,912,789 | 10/1975 | Frevel et al. | 260/681.5 |
| 4,101,451 | 7/1978 | Frevel et al. | 252/465 |
| 4,623,668 | 11/1986 | Broecker et al. | 502/38 |

FOREIGN PATENT DOCUMENTS

| | | |
|---|---|---|
| 215703 | 7/1981 | Czechoslovakia . |
| 2459761 | 7/1976 | Fed. Rep. of Germany . |
| 47-33083 | 11/1972 | Japan . |
| 47-33085 | 11/1972 | Japan . |

*Primary Examiner*—Paul E. Konopka

[57] ABSTRACT

Process for the regeneration of deactivated copper-containing catalysts used in methanol or methyl formate dissociation reactions or in the steam reforming of methanol by first oxidizing then reducing the copper component of the copper-containing catalyst.

6 Claims, No Drawings

REGENERATION OF METHANOL DISSOCIATION CATALYSTS

BACKGROUND OF THE INVENTION

Catalyst deactivation is a common problem encountered in the use of heterogeneous catalysts and may be due to poisoning, sintering, metal fouling or deposition of carbonaceous materials on the surface of the catalyst ("coking"). Some catalyst deactivation processes, such as sintering, are essentially irreversible and the affected catalyst must be replaced. Other deactivation processes, such as coking, are partially or completely reversible and the service life of the catalyst can be significantly extended by the proper choice of regeneration methods and conditions.

Unfortunately, there is no "universal" method of catalyst regeneration. Both the cause of catalyst deactivation and the nature of the catalyst itself (composition, preparation history, etc.) must be considered in choosing a regeneration method.

Catalysis of the methanol dissociation reaction, or the related methyl formate dissociation reaction, to produce hydrogen and CO is of current interest as a route to "clean" fuel from an easily stored, readily available source. Copper-based catalysts are generally more active than non-copper containing catalysts in methanol dissociation reactions. However, these copper-containing catalysts gradually deactivate at a rate which depends both on the catalyst composition and the reaction conditions.

"Coke", a common cause of catalyst deactivation, can usually be removed by heating the deactivated catalyst in an oxidizing atmosphere until oxidation or "burn-off" of the coke is complete. However, the optimum conditions for regeneration are dependent on the nature of the particular catalyst. For example, the rate at which the carbon deposits are removed as CO or $CO_2$ generally increases with temperature, but above a critical temperature (which is determined by the catalyst), the catalyst may sinter, with dramatic loss of catalytic activity.

SUMMARY OF THE INVENTION

This invention is directed to a process for the regeneration of deactivated copper-containing catalysts useful for methanol or methyl formate dissociation reactions or for the steam reformation of methanol comprising the steps of (a) oxidizing the deactivated copper-containing catalyst by contacting the catalyst with an oxygen-containing atmosphere at a temperature of 100° C. to 500° C. and a pressure of 10 kPa to 5000 kPa for a time sufficient to substantially oxidize the copper component of the deactivated copper-containing catalyst, and (b) reducing the oxidized copper-containing catalyst of (a) by contacting the catalyst with a reducing atmosphere at a temperature of 100° C. to 400° C. and a pressure of 10 kPa to 5000 kPa for a time sufficient to substantially reduce the oxidized copper component of the copper-containing catalyst.

DETAILED DESCRIPTION OF THE INVENTION

Preferably, the oxidation is conducted at a temperature of 275° C. to 400° C. and 50 kPa to 400 kPa. Air provides a convenient source of oxygen. Oxygen, or the combination of oxygen and inert gases such as nitrogen and argon, may also be used with at least 1 vol% oxygen, preferably 15–30% oxygen. Treatment time is at least 15 minutes, but may be as long as 24 h to 48 h. Preferably, the oxidation is conducted over 2–18 h.

Preferably, the reduction is conducted at a temperature of 200° C. to 300° C. and 100 kPa to 300 kPa. The preferred reducing gases are hydrogen, carbon monoxide, or mixtures thereof. Mixtures of reducing gases with inert gases such as nitrogen or argon may be used with at least 0.2 vol%, preferably 2 to 10 vol%, of the reducing gas. The reduction time is at least 15 min and preferably 2 to 3 h.

Typically, the catalysts are regenerated in-situ by passing the oxidizing or reducing gases over the catalysts in the reactor. Deactivated catalysts may also be removed from the reactor and regenerated in an oven or a furnace. Gas flowrates during regeneration are not critical, and regeneration may even be conducted in a static atmosphere.

Catalysts for which this regeneration method is useful are well-known in the art and include coppercontaining catalysts for methanol or methyl formate dissociation and methanol reforming reactions. Examples of such catalysts include compositions which contain supported or unsupported copper and one or more elements selected from the group consisting of Cr, Mn, Ru, Pd, Zn, Si, Mg, Ca, Sr, and Ba.

EXAMPLES

General procedure

Typically, about 2.0 g of calcined catalyst (−12 to 20 mesh) was loaded in a ⅜" (0.953 cm) OD tubular U-shaped reactor made of an Ni-Cr-Fe-Mn-Si-Cu alloy which was heated in a sandbath. Several grams of silicon carbide were loaded on the top of the catalyst bed to fill the reactor volume. The reactor system includes two parallel reactors in separate sandbaths. Calcined catalysts were reduced before the dissociation or reforming reactions at 250° C. and 200 kPa in 100 sccm of $N_2/H_2$ (95/5) for about 3 h.

Most of the Cu-based catalysts evaluated showed gradual deactivation. The rate of deactivation depends on both the catalyst composition and the reaction conditions, and tends to increase with reaction temperature. To evaluate the efficiency of regeneration, a series of reactions was conducted until significant deactivation (as judged by conversion) was observed. Then the feed was stopped, the reactors purged with nitrogen for few minutes, the catalysts regenerated, and the reactions resumed.

The reaction products were analyzed by two gas chromatographs connected in series and equipped with thermoconductivity detectors. $CO_2$, methanol, methyl formate, dimethyl ether, water and other high boiling products were separated and analyzed in the first GC column (80/100 Porapak T, ⅜"×8' packed column), operated in a temperature-programming mode from 100° C. to 160° C. at 8° C./min. Gaseous products such as CO, $H_2$, and methane were separated and analyzed in the second column (molecular sieve 5A, ⅜"×8' packed column) operated at 70° C. The carrier gas for both chromatographs was 8.5% $H_2$ in He at 39 sccm.

The conversion of methanol or methyl formate is defined as moles of methanol or methyl formate converted per mole of methanol or methyl formate fed. CO and hydrogen are the major products in the methanol dissociation reaction; methyl formate production is significant at low methanol conversions. Other products include small amounts of $CO_2$, dimethyl ether and trace amounts of water and methane.

For methanol dissociation, the selectivity to CO is defined as moles of CO produced per mole of methanol reacted. The selectivity to methyl formate is two times the moles of methyl formate produced per mole of methanol converted. For methyl formate dissociation, the selectivity to CO (or methanol) is defined as ½ the moles of CO (or methanol) produced per mole of methyl formate converted.

The following examples illustrate the method of this invention and show that in most cases, the catalytic activity can be completely restored over many deactivation/reactivation cycles without an increase in the catalyst deactivation rate.

Comparative experiments demonstrate that treatment of the deactivated catalyst with either $CO_2$ or $N_2/H_2O$, followed by the reduction in $N_2/H_2$ does not restore catalytic activity. Similarly, oxidation alone, reduction alone or a two-step reduction are ineffective in reactivating these catalysts.

TABLE 1

Regeneration Treatment Conditions, Methods A-R

| | Step 1 | | | | Step 2 |
|---|---|---|---|---|---|
| Method | Atm. (molar ratios) | Temp. (°C.) | Time (h) | Press. (kPa) | Press. (kPa) |
| A | Air | 300 | 2 | 300 | 300[a] |
| B | $CO_2$ | 375 | 0.5 | 200 | 200[a] |
| | | 250 | 1.5 | 200 | |
| C | $N_2$/Air (3/1) | 375 | 2 | 200 | 200[a] |
| D | $N_2/H_2O$ (4/1) | 375 | 2 | 200 | 200[a] |
| E | Air | 375 | 2 | 200 | 200[a] |
| F | Air | 250 | 2 | 200 | 200[a] |
| G | Air | 250 | 15 | 200 | 200[a] |
| H | Air | 375 | 15 | 200 | 200[a] |
| I | Air | 375 | 15 | 200 | (none) |
| J | Air | 325 | 16 | 200 | 200[a] |
| K | $N_2/H_2$ (95/5) | 275 | 3.3 | 200 | (none) |
| L | $N_2/H_2$ (1/1) | 275 | 0.3 | 200 | 200[b] |
| M | Air | 300 | 2 | 200 | 200[a] |
| N | $N_2/H_2$ (95/5) | 250 | 2.2 | 200 | (none) |
| O | Air | 375 | 21 | 200 | 200[c] |
| P | Air | 375 | 16 | 100 | 200[d] |
| Q | Air | 375 | 15 | 200 | 200[d] |
| R | Air | 375 | 16 | 200 | 200[e] |

[a]$N_2/H_2$ (95/5), 250° C., 2 h.
[b]$N_2/H_2/CO$ (2/2/1), 275° C., 1 h.
[c]$N_2/CO$ (95/5), 250° C., 3 h.
[d]$N_2/H_2$ (95/5), 250° C., 3 h.
[e]$N_2/H_2$ (95/5), 250° C., 3.5 h.

EXAMPLE 1

This example, using a Cu/Cr/Si catalyst, demonstrates that treatment of deactivated catalyst in air or in $N_2$/air, followed by reduction in $N_2/H_2$ increases the catalyst activity (Treatments "A", "C", "E"). Comparative experiments involving treatment of deactivated catalyst with either $CO_2$ or $N_2/H_2O$, followed by reduction in $N_2/H_2$ show no restoration of catalytic activity (Treatments "B", "D"). The reaction conditions, selectivity and conversion data for methanol dissociation are given in Table 2. Catalyst regeneration treatment conditions are given in Table 1.

The catalyst was prepared by charging a 500 ml glass separatory funnel with 400 mL of an aqueous solution of $Cu(NO_3)_2.3H_2O$ (76.25 g) and $Cr(NO_3)_3.9H_2O$ (51.25 g). The funnel was positioned above the glass mixing jar of a standard 1250cc food blender, which was charged with 400 mL of an aqueous slurry of $SiO_2$ (1.520 g) and NaOH (25.00 g). Attached to the outlet end of the funnel was a 10mm OD glass tube of sufficient length to extend down through the jar cover to within ½" of the blender blades. The solution from the funnel was added over 15-30 min to the rapidly stirring slurry in the blender. The resulting precipitate was separated by filtration and washed with warm water until the washings were neutral (pH 6-7). The resulting powder was transferred to a clean blender, reslurried with acetone, filtered and the process repeated. The resulting free-flowing powder was reslurried with acetone and dried on a rotary evaporator at 60° C. to give a granulated powder. Particles in the −12,+20 mesh size range were calcined by heating to 300° C. for 3h in a small muffle furnace to give the catalyst used in this Example.

TABLE 2

Selectivity and Conversion Data for Example 1

| Temp. (°C.) | Press. (kPa) | Feed (sccm) | Time (h) | Sel. to MF | Sel. to CO | MeOH Conv. |
|---|---|---|---|---|---|---|
| 250 | 200 | 35 | 16.5 | 1.3 | 92.8 | 77.2 |
| 273 | 200 | 35 | 21.9 | 0.3 | 91.7 | 93.4 |
| 274 | 300 | 105 | 22.8 | 3.1 | 92.1 | 69.7 |
| 277 | 300 | 105 | 89.1 | 8.5 | 86.1 | 59.3 |
| Treatment "A" | | | | | | |
| 273 | 300 | 105 | 89.4 | 2.8 | 89.3 | 70.0 |
| 275 | 300 | 105 | 158.1 | 10.9 | 84.2 | 56.3 |
| Treatment "B" | | | | | | |
| 275 | 290 | 105 | 158.9 | 11.4 | 82.5 | 55.7 |
| 276 | 300 | 105 | 174.6 | 13.7 | 81.3 | 53.8 |
| Treatment "C" | | | | | | |
| 275 | 295 | 105 | 176.3 | 8.1 | 85.0 | 59.8 |
| 274 | 300 | 105 | 193.4 | 12.5 | 82.3 | 54.9 |
| Treatment "D" | | | | | | |
| 275 | 300 | 105 | 194.0 | 18.0 | 71.0 | 43.2 |
| 275 | 300 | 105 | 243.6 | 20.0 | 74.3 | 48.1 |
| Treatment "E" | | | | | | |
| 275 | 300 | 105 | 244.0 | 6.7 | 85.7 | 59.1 |
| 274 | 295 | 105 | 310.5 | 14.8 | 77.7 | 55.0 |

EXAMPLE 2

This example, using a Cu/Cr/Ba/Si catalyst, demonstrates that treatment of deactivated catalyst in air or in $N_2$/air, followed by reduction in $N_2/H_2$ increases the catalyst activity (Treatments "A", "C", "E"). Comparative experiments involving treatment of deactivated catalyst with either $CO_2$ or $N_2/H_2O$, followed by reduction in $N_2/H_2$ show no restoration of catalytic activity (Treatments "B", "D"). The reaction conditions, selectivity and conversion data for methanol dissociation are given in Table 3.

The catalyst used in this Example was prepare by the procedure of Ex. 1, using 400 mL of an aqueous solution of $Cu(NO_3)_2.3H_2O$ (80.25 g), $Cr(NO_3)_3.9H_2O$ (19.24 g) and $Ba(NO_3)_2$ (1.19 g) in the funnel and 400 mL of an aqueous slurry of Cabosil ™ (1.400 g) and $Na_2CO_3$ (46.0 g) in the blender. The dried powder was fired in a vacuum at 300° C. for 3 h in a small muffle furnace.

TABLE 3

Selectivity and Conversion Data for Example 2

| Temp. (°C.) | Press. (kPa) | Feed (sccm) | Time (h) | Sel. to MF | Sel. to CO | MeOH Conv. |
|---|---|---|---|---|---|---|
| 247 | 200 | 35 | 17.5 | 1.2 | 93.5 | 78.6 |
| 274 | 200 | 35 | 21.5 | 0.1 | 93.1 | 92.5 |
| 272 | 295 | 105 | 22.4 | 2.3 | 93.0 | 74.9 |
| 275 | 295 | 105 | 88.6 | 12.0 | 83.7 | 57.1 |
| Treatment "A" | | | | | | |
| 274 | 295 | 105 | 89.3 | 4.4 | 90.4 | 66.9 |
| 274 | 295 | 105 | 156.4 | 18.9 | 74.7 | 52.5 |
| Treatment "B" | | | | | | |
| 274 | 290 | 105 | 171.4 | 26.8 | 67.4 | 50.8 |
| 274 | 300 | 105 | 172.3 | 25.3 | 68.7 | 51.1 |

TABLE 3-continued

Selectivity and Conversion Data for Example 2

| Temp. (°C.) | Press. (kPa) | Feed (sccm) | Time (h) | Sel. to MF | Sel. to CO | MeOH Conv. |
|---|---|---|---|---|---|---|
| | | | Treatment "C" | | | |
| 274 | 300 | 105 | 173.5 | 7.3 | 85.9 | 63.6 |
| 273 | 300 | 105 | 190.7 | 17.5 | 76.7 | 54.9 |
| | | | Treatment "D" | | | |
| 274 | 300 | 105 | 191.7 | 31.3 | 60.8 | 46.9 |
| 273 | 305 | 105 | 239.9 | 17.6 | 77.1 | 53.9 |
| | | | Treatment "E" | | | |
| 274 | 295 | 105 | 254.8 | 4.0 | 90.8 | 70.1 |
| 273 | 300 | 105 | 307.2 | 15.3 | 79.5 | 55.8 |

EXAMPLE 3

A 0.53 g portion of the deactivated catalyst of Example 1 was used to demonstrate that deactivated catalyst can be repeatedly regenerated by treatment in air at 375° C., followed by reduction in $N_2/H_2$ at 250° C. (Treatment "H"). Partial regeneration occurred during treatments "F" and "G", when the temperature during oxidation was 250° C. Treatment in air at 375° C. without subsequent reduction did not regenerate the catalyst (Treatment "I"). Reaction conditions, selectivity and conversion data for methanol dissociation are given in Table 4.

TABLE 4

Selectivity and Conversion Data for Example 3

| Temp. (°C.) | Press. (kPa) | Feed (sccm) | Time (h) | Sel. to MF | Sel. to CO | MeOH Conv. |
|---|---|---|---|---|---|---|
| 273 | 300 | 35 | 22.9 | 8.8 | 85.8 | 59.2 |
| | | | Treatment "F" | | | |
| 274 | 300 | 35 | 23.4 | 2.7 | 87.7 | 69.0 |
| 275 | 300 | 35 | 47.6 | 6.1 | 88.2 | 63.4 |
| | | | Treatment "G" | | | |
| 274 | 300 | 35 | 50.5 | 6.8 | 85.7 | 61.5 |
| 274 | 300 | 35 | 52.2 | 7.4 | 85.8 | 61.1 |
| | | | Treatment "H" | | | |
| 275 | 300 | 35 | 53.7 | 1.5 | 93.2 | 76.2 |
| 273 | 300 | 35 | 128.9 | 5.1 | 91.1 | 65.4 |
| | | | Treatment "H" | | | |
| 275 | 300 | 35 | 130.6 | 1.7 | 94.0 | 75.7 |
| 274 | 300 | 35 | 205.0 | 5.0 | 91.7 | 65.9 |
| | | | Treatment "H" | | | |
| 275 | 300 | 35 | 206.7 | 1.4 | 95.1 | 77.4 |
| 274 | 300 | 35 | 318.8 | 5.3 | 91.4 | 65.3 |
| | | | Treatment "I" | | | |
| 276 | 300 | 35 | 319.5 | 4.3 | 90.4 | 65.0 |

EXAMPLE 4

This Example describes the activity and selectivity of a Cu/Cr/Ba/Si catalyst before and after various treatments. Again, it is shown that sequential oxidation/reduction effectively restores catalystic activity (Treatment "j"), while one-step or two-step reduction treatments are ineffective (Treatments "K","L"). Table 5 lists the reaction conditions, selectivity and conversion data for methanol dissociation.

The catalyst preparation described in Ex. 1 was followed, using 400 mL of an aqueous solution of Cu(NO₃)₃O.3H₂O (11.432 g), Cr(NO₃)₃O.9H₂O (87.04 g) and Ba(NO₃)₂ (0.72 g) in the funnel, and 400 mL of an aqueous slurry of Cabosil ™ (0.806 g) and NaOH (18.00 g) in the blender. The dried powder was fired at 300° C. for 3 h in a small muffle furnace to give the catalyst used in this Example.

TABLE 5

Selectivity and Conversion Data for Example 4

| Temp. (°C.) | Press. (kPa) | Feed (sccm) | Time (h) | Sel. to MF | Sel. to CO | MeOH Conv. |
|---|---|---|---|---|---|---|
| 273 | 300 | 105 | 40.8 | 1.9 | 94.7 | 75.0 |
| 274 | 300 | 105 | 216.1 | 5.4 | 91.0 | 64.0 |
| | | | Treatment "J" | | | |
| 276 | 295 | 105 | 222.5 | 1.2 | 96.2 | 79.8 |
| 275 | 295 | 105 | 384.0 | 2.6 | 94.6 | 73.8 |
| | | | Treatment "J" | | | |
| 274 | 295 | 105 | 390.7 | 1.4 | 95.8 | 77.2 |
| 277 | 300 | 105 | 531.4 | 4.3 | 92.6 | 68.8 |
| | | | Treatment "K" | | | |
| 277 | 295 | 105 | 536.7 | 14.5 | 82.6 | 55.6 |
| 276 | 295 | 105 | 555.9 | 6.5 | 90.2 | 65.0 |
| | | | Treatment "L" | | | |
| 276 | 300 | 105 | 557.6 | 5.5 | 91.7 | 65.7 |
| 276 | 295 | 105 | 586.0 | 5.4 | 91.1 | 65.9 |

EXAMPLE 5

This Example demonstrates that the methanol dissociation activity of a Cu/Cr/Zn catalyst can be enhanced by treatment of the catalyst in air at 300° C., followed by $N_2/H_2$ at 250° C. (Treatment "M"). Reduction of the catalyst does not enhance activity (Treatment "N"). (Table 6)

The catalyst preparation described in Example 1 was repeated, using 500 mL of an aqueous solution of Cu(NO₃)₂O.3H₂O (72.80 g), Cr(NO₃)₃O.9H₂O (47.36 g) and Zn(NO₃)₂O.6H₂O (60.67 g) in the funnel and a 500 mL aqueous solution of Na₂CO₃ in the blender. The dried powder was calcined in air at 300° C. for 3 h to give the catalyst used in this Example.

TABLE 6

Selectivity and Conversion Data for Example 5

| Temp. (°C.) | Press. (kPa) | Feed (sccm) | Time (h) | Sel. to MF | Sel. to CO | MeOH Conv. |
|---|---|---|---|---|---|---|
| 250 | 200 | 35 | 0.7 | 2.1 | 93.2 | 66.0 |
| 250 | 200 | 35 | 2.3 | 5.4 | 89.8 | 49.4 |
| 250 | 200 | 35 | 3.3 | 6.8 | 88.0 | 44.7 |
| 250 | 200 | 35 | 19.7 | 12.8 | 80.2 | 30.4 |
| | | | Treatment "M" | | | |
| 250 | 200 | 35 | 43.7 | 5.5 | 88.6 | 51.1 |
| 250 | 200 | 35 | 44.6 | 8.6 | 85.3 | 44.2 |
| 250 | 200 | 35 | 48.3 | 10.6 | 82.8 | 38.9 |
| 250 | 200 | 35 | 48.7 | 10.8 | 82.2 | 38.7 |
| | | | Treatment "N" | | | |
| 250 | 200 | 35 | 49.8 | 13.2 | 79.3 | 29.6 |
| 250 | 200 | 35 | 50.3 | 13.9 | 78.4 | 29.0 |
| 250 | 200 | 35 | 50.7 | 13.5 | 78.7 | 29.2 |

EXAMPLE 6

This Example shows that the regeneration process described in this invention can also be applied to a Cu/Cr/Mn catalyst (1.3 g) which is deactivated during methyl formate dissociation.

The catalyst preparation described in Example 1 was repeated, using 400 mL of an aqueous solution of Cu(NO₃)₂O.3H₂O (76.25 g), Cr(NO₃)₃O.9H₂O (51.25 g) and Mn(NO₃)₂ (3.6 g of a 50.52 wt% solution) in the funnel and 400 mL of an aqueous solution of Na₂CO₃ (60.0 g) in the blender. The dried powder was fired at 300° C. and about 200 kPa for 3 h in the reactor in 160 sccm of air to give the catalyst used in this Example.

TABLE 7

Selectivity and Conversion Data for Example 6[a]

| Temp. (°C.) | Press. (kPa) | Feed (g/h g cat.) | Time (h) | Sel. to MeOH | Sel. to CO | MF Conv. |
|---|---|---|---|---|---|---|
| 200 | 200 | 16.9 | 42 | 47.5 | 51.7 | 32.4 |
| Treatment "E" | | | | | | |
| 200 | 200 | 16.9 | 43 | 41.7 | 50.7 | 46.6 |

[a] During this methyl formate dissociation reaction, the temperature was varied from 150° C.–250° C. and the flowrate ranged from 17.5 to 230 sccm.
[b] The feed contains 97% methyl formate and 3% methanol.
[c] The "time" includes actual on-line reaction time only; the catalyst was kept in the reactor at 150° C. under $N_2$ during weekends and overnight.

EXAMPLE 7

This Example shows an extensive lifetime and regeneration study of a Cu/Cr/Ba/Si catalyst. The catalyst was exposed to various reaction environments. Feeds included methanol, methanol and $CO_2$, and methanol and water. Various treatments were conducted during about 5 months of operation, some of which are listed here. This Example again demonstrates the catalystic activity can be completely and repeatedly restored over an extended time period by the regeneration process described by this invention (Treatments "O","P","Q","R"). It also demonstrates that CO may be used as the reductant in the second step (Treatment "O"). This Example also shows that this regeneratino process can be applied to copper-containing catalysts used in the steam-reforming of methanol and in reactions involving methanol and $CO_2$.

The catalyst used in this Example was prepared as in Example 2.

TABLE 8

Selectivity and Conversion Data for Example 7

| Temp. (°C.) | Press. (kPa) | Feed (g/h g cat.) | Time[a] (h) | Sel. to CO | MeOH Conv. |
|---|---|---|---|---|---|
| 275 | 300 | 4.5, MeOH | 26 | 92.6 | 69.5 |
| 276 | 300 | 4.5, MeOH | 212 | 74.3 | 51.9 |
| | | Treatment "O" | 215 | | |
| 274 | 290 | 4.5, MeOH | 241 | 93.0 | 71.3 |
| 246 | 105 | 6.0, MeOH | 1011 | 38.9 | 44.9 |
| | | Treatment "P" | 1012 | | |
| 251 | 105 | 6.0, MeOH | 1032 | 71.8 | 52.2 |
| 277 | 295 | 3.5, MeOH/$H_2O$ (1/1) | 1390 | 5.5 | 62.4 |
| 274 | 295 | 4.9, MeOH/$CO_2$ (77/23) | 1934 | 49.1 | 46.7 |
| | | Treatment "Q" | 2069 | | |
| 275 | 295 | 4.5, MeOH | 2090 | 92.6 | 70.8 |
| 275 | 295 | 4.9, MeOH/$CO_2$ (77/23) | 2094 | 95.5 | 75.2 |
| 274 | 200 | 4.5, MeOH | 3555 | 87.9 | 61.2 |
| | | Treatment "R" | 3556 | | |
| 273 | 200 | 4.5, MeOH | 3580 | 93.3 | 74.5 |

[a] Time on-stream includes the treatment times in this example only.

What is claimed:

1. A process for the regeneration of deactivated copper-containing catalysts containing supported or unsupported copper and one or more elements selected from the group consisting of Cr, Mn, Ru, Pd, Zn, Si, Mg, Ca, Sr, and Ba used for methanol or methyl formate dissociation reactions or for the steam reforming of methanol comprising the steps of:
   (a) oxidizing the deactivated copper-containing catalyst by contacting the catalyst with an oxygencontaining atmosphere containing at least 1 volume percent of oxygen at a temperature of 275° C. to 400° C. and a pressure of 10 kPa to 5000 kPa for a time sufficient to substantially oxidize the copper component of the deactivated copper-containing catalyst; and
   (b) reducing the oxidized copper-containing catalyst of (a) by contacting the catalyst with a reducing atmosphere at a temperature of 100° C. to 400° C. and a pressure of 10 kPa to 5000 kPa for a time sufficient to substantially reduce the oxidized copper component of the copper-containing catalyst.

2. The process of claim 1 wherein the pressure of (a) is 50 kPa to 400 kPa.

3. The process of claim 1 wherein the temperature of (b) is 200° C. to 300° C. and the pressure of (b) is 100 kPa to 300 kPa.

4. The process of claim 2 wherein the oxygen-containing atmosphere contains from 15 to 30 volume percent of oxygen and the time of (a) is from 2 hours to 18 hours.

5. The process of claim 3 wherein the reducing atmosphere consists essentially of a mixture of inert gas from 2 to 10 volume percent of at least one reducing gas selected from the group consisting of hydrogen and carbon monoxide, and the time of (b) is from 2 hours to 3 hours.

6. The process of claim 5 wherein steps (a) and (b) are conducted in-situ.

* * * * *